United States Patent [19]

Gorisch et al.

[11] Patent Number: 4,752,937
[45] Date of Patent: Jun. 21, 1988

[54] GAS LASER AND PRODUCTION PROCESS THEREFOR

[75] Inventors: Wolfram Gorisch, Aschaffenburg; Rolf Malkmus, Hanau; Rainer Nitsche, Offenbach; Walter Skrlac; Dieter Wendt, both of Bruchköbel; Walter Wohlfart, Kleinostheim, all of Fed. Rep. of Germany

[73] Assignee: W. C. Heraeus GmbH, Hanau, Fed. Rep. of Germany

[21] Appl. No.: 912,941

[22] Filed: Sep. 29, 1986

[30] Foreign Application Priority Data

Oct. 16, 1985 [DE] Fed. Rep. of Germany ....... 3536770

[51] Int. Cl.$^4$ .............................................. H01S 3/04
[52] U.S. Cl. ......................................... 372/88; 372/34; 372/35; 372/55; 372/61
[58] Field of Search ............... 372/88, 87, 61, 55, 372/33–35

[56] References Cited

U.S. PATENT DOCUMENTS

| | | | |
|---|---|---|---|
| 4,325,006 | 4/1982 | Morton | 372/35 |
| 4,359,777 | 11/1982 | Fox et al. | 372/61 |
| 4,455,658 | 6/1984 | Sutter | 372/87 |
| 4,553,242 | 12/1985 | Opower et al. | 372/61 |
| 4,589,114 | 5/1986 | Sutter | 372/61 |
| 4,597,086 | 6/1986 | Kimbara | 372/61 |
| 4,646,313 | 2/1987 | Seelig | 372/64 |

Primary Examiner—James W. Davie
Assistant Examiner—Xuan T. Vo
Attorney, Agent, or Firm—Felfe & Lynch

[57] ABSTRACT

A gas laser has a coolable inner electrode for connection to a radio-frequency power source and a coolable outer electrode that is coaxial with and radially spaced from the inner electrode with an excitation space containing the gas to be excited in the radial space between the inner and outer electrodes. With a view to improving a laser of this type in such a way that excitation at higher power with retention of homogeneous discharge is possible, that gas decomposition is slower, and that any desired liquid coolant can be used regardless of the electrical conditions, the excitation space is radially bounded by two, tubular dielectric bodies which are coaxial with and radially spaced from each other.

14 Claims, 1 Drawing Sheet

GAS LASER AND PRODUCTION PROCESS THEREFOR

BACKGROUND OF THE INVENTION

The present invention relates to a gas laser and a proces of making it.

A known gas laser has a coolable inner electrode for connection to a radio-frequency power source and a coolable outer electrode that is coaxial with and radially spaced from the inner electrode. An excitation in the space between the electrodes contains the gas to be lasingly excited. Each side of the excitation space in the axial direction is bounded by a mirror.

A gas laser of this type is known from published German patent application DOS No. 33 39 574. Such lasers have proved themselves in actual use. In these lasers, the inner electrode is surrounded in a spaced relationship by a sheathing tube of copper, the inner electrode and the sheathing tube being connected to a radio-frequency power source. A liquid containing fluorocarbon compounds, such as the product marketed by Kalie Chemie AG under the trade name Flutec PP3, flows through the space between them for cooling purposes. This liquid coolant is distinguished by low losses for radio-frequency fields.

Another electrically-excited gas laser of circular cross section is known from German Pat. No. 33 16 778. outer electrode consists of a metal tube that is highly-conductive electrically and grounded. Its inner electrode is in the form of a sheathing tube spacedly jacketed in another sheathing tube made of a dielectric material, a liquid coolant flowing through the space between these two sheathing tubes for cooling the inner electrode.

SUMMARY OF THE INVENTION

An object of the invention is to improve a laser of this type for excitation at higher power with retention of homogeneous discharge, slower lasing-gas decomposition, and use of any desired, appropriate, fluid, preferably-liquid coolant regardless of the electrical conditions.

In accordance with the invention, this and other objects are achieved by radially bounding an excitation space between inner and outer, coaxial, radially-spaced fluid-cooled electrodes of a gas laser with two, tubular dielectric bodies which are coaxial with and radially spaced from each other. These tubular dielectric bodies completely shield the excitation space and a lasingly-excitable gas to be contained therein physically from the inner and outer electrodes. As a result, decomposition of the gas and gettering on the surfaces of the preferably-ceramic, tubular dielectric bodies are reduced by comparison with a laser arrangement in which the gas is in direct contact with the surface of at least one of the electrodes. Consequently, consumption of the gas is also reduced in both closed-loop and continuous-flow operation of the laser. The laser of the invention is further distinguished by more homogeneous laser excitation, which also contributes to improved efficiency.

To increase the output power of the laser, the generally radio-frequency excitation power can be increased. This can affect the homogeneity of the laser output, but homogeneous output is always desirable at all output powers. With lasers where the surface of a metal electrode is in direct contact with the laser gas, microarc or arc discharge from the metal electrode occurs above a certain excitation-power threshold which depends on the dimensions of the laser and other factors. This microarc or arc discharge causes the output power to drop off and, thus, the efficiency of the laser to decrease. It is of advantage, therefore, that the threshold above which these detrimental microarcs or arcs develop is much higher when, instead, the dielectric bodies bound the excitation space for contact with the gas.

The inner and outer electrodes are preferably tubular to line and envelop the inner and outer electrodes, respectively, completely.

For the cooling of the inner and outer electrodes, these may be provided with a cooling coil or cooling liner or jacket.

In a design of the gas laser that is preferable from a heat-transfer standpoint, the inner and/or outer electrodes are permanently united with the dielectric body respectively associated therewith, more preferably so that there is no separation between the respectively-united electrodes and dielectric bodies. This can be accomplished, for example, by pressure-applying an appropriatelydimensioned tubular conductor to the inner surface of the dielectric body for the inner electrode or to the outer surface of the dielectric body for the outer electrode. Perforated or latticed tubular conductors are particularly suitable for this.

A particularly good bond between the inner and/or outer conductor and the respective dielectric bodies is obtained when the inner and/or outer conductor is formed by a baked-on metallizing paste. The metallizing paste is applied to the surface of the ceramic body by brush, for example, or sprayed onto it, and then baked on. Well suited for the purpose is a silver or copper paste, and particularly a molybdenum/manganese paste. An additional corrosion-protection layer of nickel, for example, should be applied on top of the baked-on metallizing paste.

In a further modification, tubular dielectric bodies, for example, ceramic bodies, are used whose wall comprises hollow spaces (channels) which are filled with a metal that forms the electrodes. The metal is conductively connected to one terminal of the power source, so that the electrode is fully protected against corrosion.

When the coolant inlet and outlet pipe connections for the inner conductor are disposed directly adjacent to each other, for example, at one end of the laser, it becomes possible to leave the output-beam end of the laser entirely free.

The inner conductor is preferably water-cooled, which is feasible since the cooled zone and the cooling medium are not situated in the radio-frequency field. A liquid coolant distinguished by low losses for radio-frequency fields is not required. The laser then is particularly well suited for medical applications since liquid coolants which are innocuous from the health standpoint, such as water, can.then be used. The dielectric bodies used are preferably alumina-ceramic parts.

BRIEF DESCRIPTION OF THE DRAWING

Further details and characteristics of the invention will become apparent from the following description of an embodiment with reference to the accompanying drawing, wherein.

DETAILED DESCRIPTION OF THE INVENTION

Figure 1:
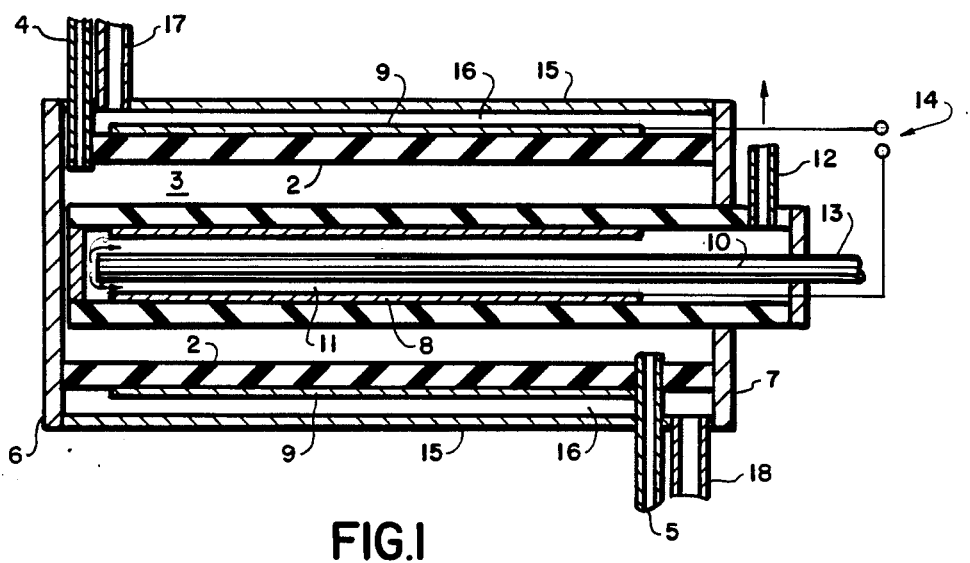
FIG. 1 shows a gas laser in accordance with the invention which is operated on a continuous gas-flow basis.

The gas laser comprises an inner ceramic tube 1 and, disposed coaxially therewith, an outer ceramic tube 2. Between the inner ceramic tube 1 and the outer ceramic tube 2, an annular excitation space 3 is formed which contains the gas to be excited. In the gas laser shown in FIG. 1, which is operated on a once-through basis, the gas is fed in through an inlet pipe connection 4 at one end and discharged through an outlet pipe connection 5 at the other end. In the axial direction, the excitation space is bounded by laser mirrors 6 and 7, respectively. A tubular inner conductor 8 of copper, for example, is inserted in the inner ceramic tube. The outer conductor 9 is likewise a tubular body. Both the inner conductor 8 and the outer conductor 9 may be perforated or latticed. The inner conductor 8 and the outer conductor 9 are applied to the ceramic bodies 1 and 2, respectively, by pressure to unite them without any gaps between them. For the cooling of the inner conductor, a cooling medium is introduced through a coolant feed tube 10, which is inserted into the inner ceramic tube 1 or the tubular inner conductor 8, respectively, and discharged through an annular discharge channel 11, into which the coolant enters at the end of the coolant feed tube 10, and from which it exits through a coolant outlet pipe connection 12 disposed in proximity to the coolant inlet pipe connection 13 of the coolant feed tube 10. The inner conductor 8 is connected to a radio-frequency power source, designated 14. For reasons of safety and for shielding purposes, the outer conductor 9 is preferably at ground potential. An outer sheath 15 is spaced from the outer ceramic tube 2 and the outer conductor 9. For the cooling of the outer electrode 9, a cooling medium is fed through a coolant inlet pipe connection 17 to the space 16 between the outer sheath 15 and the outer ceramic tube 2 and discharged through a coolant outlet pipe connection 18.

Figure 2:
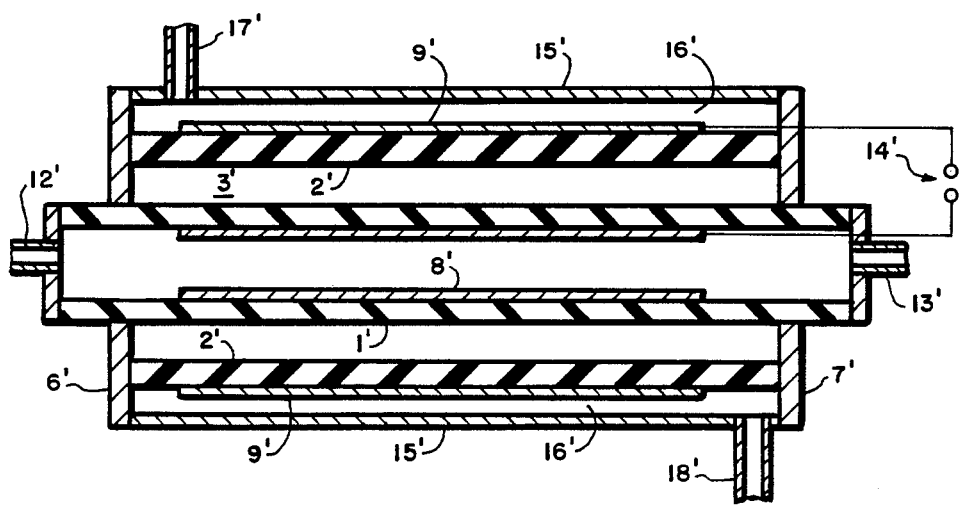
FIG. 2 shows an embodiment representing a modification of that of FIG. 1 with recirculated gas flow and a modified cooling system for the inner electrode.

In the gas laser illustrated in FIG. 2, the inner ceramic tube 1' extends outwardly through both laser mirrors 6' and 7', in contrast to the embodiment shown in FIG. 1. In this arrangement, the coolant feed pipe 10' used with the laser of FIG. 1 is not required. For the cooling of the inner electrode 8', the cooling medium is introduced through a coolant inlet pipe connection 13' at one end of the inner ceramic tube 1' and discharged through a coolant outlet pipe connection 12' at the other end of the inner ceramic tube 1'. Moreover, this laser is not operated on a continuous gas-flow basis, and the inlet and outlet pipe connections 4 and 5 are not required. In the embodiment of FIG. 2, the inner conductor 8' and the outer conductor 9' are deposited in the form of a metallizing paste on the inner surface of the inner ceramic tube 1' and on the outer surface of the outer ceramic tube 2', The metallizing paste, in this case a molybdenum/manganese paste, was applied with a brush. The metallizing paste so applied to the ceramic tubes was then baked on in an oven at a temperature ranging from 800° to 1600° C. On top of this baked-on coating, a corrosion-protection layer, which in this case consisted of nickel, was then applied.

It will be appreciated that the instant specification and claims are set forth by way of illustration and not of limitation, and that various changes and modifications may be made without departing from the spirit and scope of the present invention.

What is claimed is:

1. A gas laser, comprising:
   inner and outer, coaxial, radially-spaced electrodes;
   means for connecting said inner and outer electrodes to a radio-frequency power source;
   cooling means for supplying a cooling fluid for fluid cooling said inner and outer electrodes;
   two tubular, dielectric bodies in the radial space between said inner and outer electrodes, the tubular dielectric bodies being coaxial with each other and radially spaced from each other for radially bounding a gas-containable excitation space of the laser which is physically shielded from said electrodes by the tubular dielectric bodies; and
   a mirror bounding each axial end of the excitation space, thereby forming a resonant cavity for the laser.

2. The gas laser of claim 1, wherein at least one of said inner and outer electrodes is tubular.

3. The gas laser of claim 1, wherein the cooling means for cooling said outer electrode include means for providing a cooling fluid surrounding the radially outer surface of said outer electrode.

4. The gas laser of claim 2, wherein both of said inner and outer electrodes are tubular.

5. The gas laser of claim 1, wherein said cooling means for cooling said inner electrode include fluid inlet and outlet pipes arranged adjacent to each other.

6. The gas laser of claim 2, wherein said cooling means for cooling said inner electrode include fluid inlet and outlet pipes arranged adjacent to each other.

7. The gas laser of claim 3, wherein said cooling means for cooling said inner electrode include fluid inlet and outlet pipes arranged adjacent to each other.

8. The gas laser of claim 1, wherein at least one of the electrodes comprise a metallizing paste baked onto an associated dielectric body.

9. The gas laser of claim 1, and further comprising gas inlet and outlet means for inlet and outlet of the gas containable in the excitation space.

10. The gas laser of claim 1, wherein at least one of the dielectric bodies is made of an alumina ceramic.

11. The gas laser of claim 10, wherein both dielectric bodies are made of an alumina ceramic.

12. The gas laser of claim 8, wherein the metallizing paste comprises molybdenum and manganese.

13. The gas laser of claim 1, wherein said cooling means comprises means providing a water coolant radially inside and outside of said inner and outer electrodes, respectively.

14. The gas laser of claim 3, wherein said cooling means comprises means providing a water coolant radially inside and outside of said inner and outer electrodes, respectively.

* * * * *